March 26, 1935.  W. L. EVANS  1,995,673
ELECTRIC HEATER
Filed Dec. 13, 1929
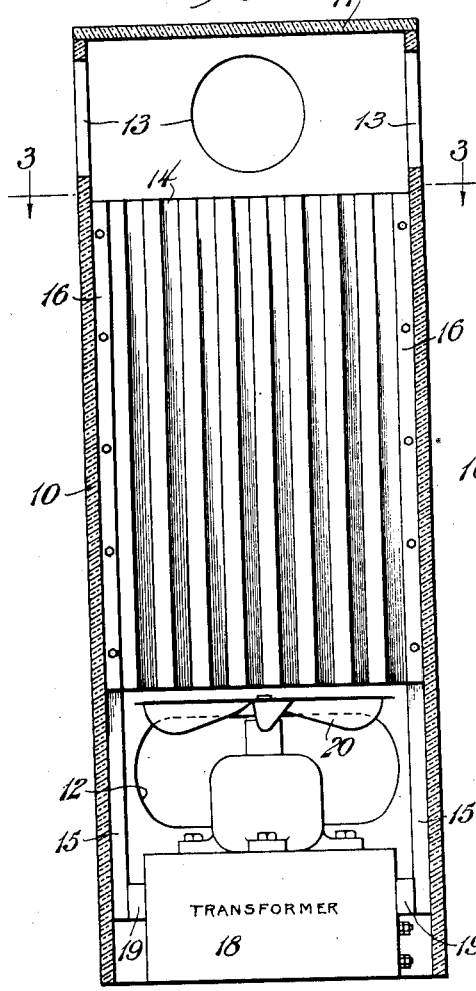
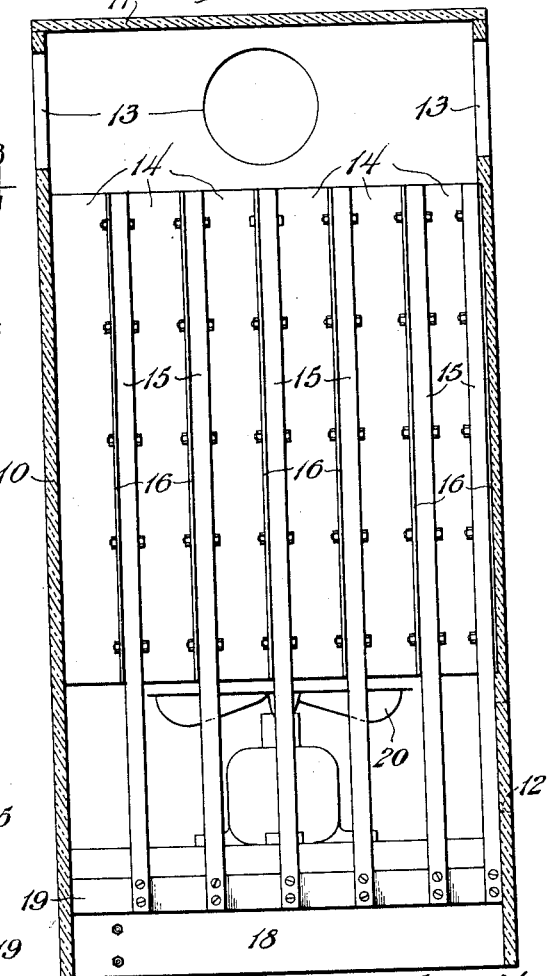
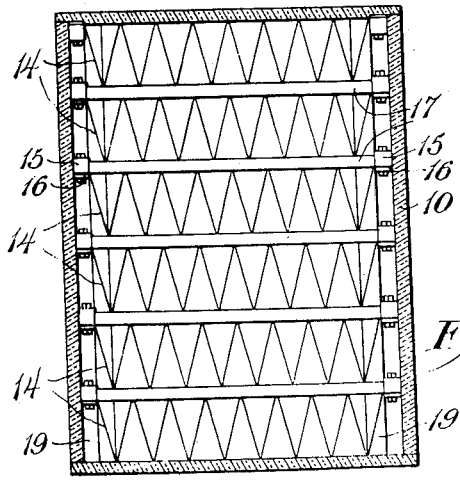
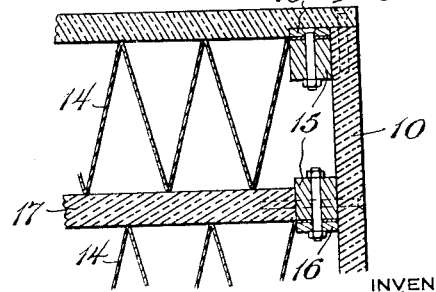
INVENTOR
W. L. Evans
BY
Siggers & Adams
ATTORNEYS Patented Mar. 26, 1935

1,995,673

UNITED STATES PATENT OFFICE 1,995,673

ELECTRIC HEATER

William L. Evans, Washington, Ind.

Application December 13, 1929, Serial No. 413,691

15 Claims. (Cl. 219—39)

This invention relates to electric heaters and, among other objects, aims to provide an improved, simple, safe, efficient, economical, convenient, and sanitary heater adapted to be used for domestic and other heating purposes.

In the accompanying drawing:

Fig. 1 is a vertical sectional view, partly in elevation, showing one embodiment of the heater;

Fig. 2 is another vertical sectional view, partly in elevation, showing one side of the heater in Fig. 1;

Fig. 3 is a sectional view taken on line 3—3 of Fig. 1; and

Fig. 4 is a fragmentary sectional view drawn on a large scale.

Heretofore, many attempts have been made to produce safe, economical and practicable electric hot air heaters such as could be used for heating houses, etc. It has long been recognized that heaters of this type are much more sanitary and cleanly, and hence, more desirable than coal, gas, oil and other fuel heaters and furnaces. However, so far as I am aware, no satisfactory electric heaters of large capacity have been produced. This is probably due largely to the fact that the ordinary high voltage, and high resistance units or heater elements consume so much power that they cannot successfully compete with coal, gas or oil heaters because of the excessive cost of the power. Moreover, they introduce a serious fire hazard and have not proven to be highly efficient for heating large volumes of air. Further, such heaters usually require considerable time to raise the temperature of a large volume of air to be heated.

This invention therefore aims to provide an improved, very efficient, electric heater which is not subject to the foregoing objections and which will successfully compete with coal and other fuels where electric power can be had at reasonably low commercial rates, thus eliminating the nuisance of dust, ashes, and obnoxious gases, as well as the work necessary to operate and maintain such heating equipment.

Referring particularly to the drawing, there is shown a hot air heater designed for use as a domestic heating unit. This type has been selected because a long series of experiments have conclusively demonstrated its great efficiency and the economy that is made possible by its use when alternating current is available at the prevalent low commercial rate.

In this example the heater is mounted in a casing 10, which may be of any convenient shape, although it is preferably made rectangular, having an open lower end to rest on the floor or a support, while the upper end is closed by a top wall 11. An air intake opening 12 is provided in one or more of the side walls adjacent to the lower end and a plurality of air outlet openings 13 are provided in the side walls adjacent to the upper end so as to direct the heated air horizontally into the space to be heated or through one or more conduits (not shown).

In accordance with this invention, a plurality of thin sheet metal resistance units or heater elements 14 are arranged in the casing and extend from one wall to the opposite wall, terminating short of the inlet and outlet openings. These heater units are preferably made of a metal having an electrical resistance of 63 to 82 ohms per mil-foot. Soft steel having a very small percentage of carbon and practically no increase of resistance when heated proved to be entirely satisfactory in making certain commercial tests. Further, it is important that the sheets shall be relatively thin, the preferred thickness being about 1/64 of an inch. Moreover, to get the best results, the sheets should be elongated in the path of the current passing through them. In this example, they are rectangular, being connected at and throughout their end edges to opposite conductors conveniently, though not necessarily, in the form of bus bars 15 which support them and the opposite side walls of the casing. Suitable clamping strips 16 are conveniently employed to insure good electrical contact between the elements and the bus bars.

The sheet metal units are shown as having vertically extending V-shaped corrugations, the depth of the corrugations in this instance being greater than their width. These corrugations not only serve to cause the units to heat uniformly and rapidly over their entire areas, but also reduce the overall length of the elements and, hence, the size of the entire heater. It was noted that plain sheets of the same size did not heat uniformly. Further, the plain sheets vibrated and were very noisy when the current was applied. The corrugations practically eliminated the vibrations and noise incident thereto. A further advantage of so corrugating the plates is to cause the current in adjacent elements to flow in zigzag, non-parallel paths and thereby greatly reduce the inductive reactance between the sheets.

To strengthen the corrugated heater elements, and further to reduce the vibrations, heat-insulating partitions 17 of suitable non-conducting material are arranged between the respective sheets and conveniently secured at their opposite edges to the bus bars 15 by means of screws passing through the opposite side walls of the casing, the arrangement being such that any element with its bus bars may be removed independently of the other elements either for repairs or to reduce the capacity of the heater. Also, all of the assembled elements are alike so that they are interchangeable.

By repeated experiments utilizing different voltages, it was found that alternating current at very low voltages gave the best results. In fact, voltages ranging between one and three and amperages ranging between 2100 and 3800 on heater elements having approximately 25 square feet of heating surface gave the most satisfactory results. Now, since the average household current is delivered at considerably higher voltages, it is necessary to employ a step down transformer 18, (shown in outline only) to produce the desired low voltage. For convenience, the transformer may be mounted in the lower part of the casing so as to be assembled at the factory with the heater elements. The electrical connections between the low side of the transformer and the bus bars preferably include a pair of horizontal conductor bars 19 of large cross sectional area and the bus bars are connected to them by means of any suitable securing means, such as machine screws, to facilitate quick assembly and also removal of the separate heater elements.

To distribute the heat produced by the heater elements and to increase the heating efficiency, an ordinary electric fan 20 of sufficient capacity is conveniently mounted adjacent to the intake end of the casing, the motor being preferably secured to the top of the transformer housing where the incoming cool air will keep it cool. However, the fan may be mounted at the upper end of the casing or in an air conduit (not shown) leading to or from the casing. The capacity of the fan for the type of heater shown was approximately one-half of the column of air to be heated per minute. The total heating surface was approximately 150 square feet in six heating elements; the volume of air heated was about 3200 cubic feet and the capacity of the fan which gave the best results was about 1500 cubic feet per minute. However, the capacity of the fan may be varied between certain limits.

It was found by a series of experiments that the heated air, when used for house heating purposes, was more pleasant if its temperature at the discharge end of the heater was about 150 degrees Fahrenheit. Hence, it was found desirable to raise the temperature of the elements to about this point and to keep the current on until the desired room temperature was reached, the electric switch being automatically controlled by an ordinary room thermostat (not shown). Since the heater elements are not raised to the ignition temperature of ordinary house building materials or of any foreign matter that may come in contact with them, the fire hazard is entirely eliminated. Moreover, the low working voltage eliminates any danger from electric shocks even though the elements may be exposed. The current of air delivered from the heater was as pleasant as a warm summer breeze. The air is not partially deoxidized by excessive heating nor deprived of its moisture. Further, the sheet metal units will last considerably longer than high resistance, high temperature and expensive elements.

The results of one practical test of a heater embodying the invention will demonstrate some of the most important advantages. A heater having five soft steel, low carbon elements of approximately 125 square feet of heating surface was placed in a large room of a brick office building. The size of the room was 3240 cubic feet. The outside temperature was 44 degrees Fahrenheit. When the transformer delivered 2.15 volts and 3349 amperes to all of the units the temperature rise in the room was 16 degrees in five minutes. This showed a cost of $0.00075 per degree of rise at the commercial rate of 2 cents per k. w. h. The cost of heating the office room at this rate, allowing a temperature drop of ten degrees per hour (far more than the average drop) would be seven and one-half mills per hour or 12 cents per 16 hour heating day. Hence, for a house having 8100 cubic feet (five rooms 12 x 15 x 9 feet) the cost would be 30 cents per 16 hour day. It is hardly necessary to explain further the significance of the foregoing results or any more advantages of the invention.

While the results of the foregoing commercial test were satisfactory, it was determined that the improved heater could be operated very economically when the current was supplied at not more than 10 volts, and the amperage was varied accordingly. Further, the temperature of the heating elements could also be varied up to about 300 degrees and their area and thickness could be varied within certain limits without introducing any element of danger or sacrificing a great deal of efficiency. Consequently, when the term "low voltage" is used in the accompanying claims, it should be construed as meaning that the voltage does not exceed 10 volts, notwithstanding that the best results were obtained with a much lower voltage. Also, the term "substantial area" as applied to the heating elements should be construed as meaning several square feet of heating surface as distinguished from the small heating surface of wire and ribbon resistance elements.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In an electric heater, a source of low voltage alternating current not exceeding ten volts and of not less than 2000 amperes nor more than 4000 amperes, a pair of spaced elongated bus bars of substantial cross sectional area connected to said source of current; and a heating element having a low electrical resistance formed from a thin metal sheet of greater length than width and electrically connected throughout its width at each end to said bus bars; said sheet having deep, acute-angled corrugations crosswise throughout thereby providing means to reduce the inductance of said element, to prevent vibration of the same and to promote uniform heating over the entire area.

2. In an electrical heater of the class described, a source of low voltage and high amperage alternating current; a pair of spaced, vertical bus bars of substantial cross-sectional area connected to said source of current; a heating element composed of a thin rectangular metal sheet of relatively low resistance and large area connected at its ends throughout its width to said bus bars; said sheet having a plurality of broad adjacent sections bent sharply at acute angles to each other and providing means to eliminate noisy vibrations when the voltage is applied and to distribute the current substantially uniformly throughout the sheet.

3. An electric heater of the class described comprising, in combination, a pair of spaced vertical bus bars of substantial cross sectional area; a source of alternating current connected to deliver not more than ten volts and between 2100 and 3800 amperes to said bus bars; an elongated sheet metal heating element having a large heating surface and electrically connected at its ends to said bus bars; and a plurality of vertical substantially V-shaped corrugations extending throughout the height of said heating element.

4. An electric heater of the class described comprising, in combination, a pair of spaced vertical conductors constituting bus bars of substantial cross sectional area; a source of alternating current connected to deliver not more than ten volts and not less than 2000 amperes to said bus bars; a thin, rectangular sheet metal heating element having a large heating surface and connected at its ends to said bus bars; and a plurality of vertical V-shaped corrugations of greater depth than width throughout the height of said heating element so as to make the overall length of the sheet when assembled less than its height and to distribute the heat uniformly throughout the sheet.

5. An electric heater comprising, in combination, a pair of split vertical conductors of substantial cross sectional area constituting bus bars; a source of low voltage and high amperage alternating current connected to said bus bars; a thin sheet metal heating element presenting a large heating surface and presenting end edges clamped in said bus bars; a plurality of approximately vertical V-shaped corrugations in said sheet; and a fan arranged to circulate air longitudinally of said corrugations.

6. An electric heater of the class described comprising, in combination, a casing having air inlet and outlet openings; a plurality of elongated corrugated sheet metal heating units of low electrical resistance arranged in the casing with their corrugations extending lengthwise of the casing; a source of current not exceeding ten volts and of not less than 2000 amperes nor more than 3800 amperes electrically connected to the opposite end edges of said units; and means to circulate air at a high velocity through the corrugations and in intimate contact with all of said units.

7. In an electric heater, an insulated, vertical casing; a plurality of thin, vertically corrugated, sheet metal heater elements of low electrical resistance arranged closely adjacent to each other within the casing; a source of alternating current not exceeding ten volts and of not less than 2000 amperes connected to said elements; partitions of insulating material between said elements and in contact with the several edges of the corrugations to lessen vibration of the elements; and means to circulate air through the casing and in intimate contact with all of said elements.

8. In an electric heater, an insulated, vertical casing; a plurality of thin, sheet metal heater elements of low electrical resistance arranged closely adjacent to each other within the casing; electrical conductors of substantial cross-sectional area on opposite sides of the casing connected to and supporting said elements; vertical partitions of insulating material between the elements also connected to said conductors; and a fan arranged to circulate air through the casing in intimate contact with all of the elements.

9. An electric heater of the class described comprising, in combination, a casing having air inlet and outlet openings adjacent to its opposite ends; a plurality of corrugated thin sheet metal heating elements of low electrical resistance extending across the casing from one side to the other and arranged between the inlet and outlet openings; electrical conductors of substantial cross sectional area connected to and supporting said heating elements; a source of low voltage and high amperage current connected to said conductors; and a fan adjacent to one end of the casing arranged to circulate air through said corrugations on both sides of said elements.

10. An electric heater comprising, in combination, an upright casing having an air inlet opening adjacent to its lower end and a plurality of outlet openings adjacent to the upper end; a plurality of bent thin sheet metal heater elements of low electrical resistance extending entirely across the casing and terminating short of said openings; bus bars connected to the heating elements at opposite sides of the casing; a source of low voltage and high amperage alternating current connected to the bus bars; and a fan within the casing arranged to force a draft of air between said plates and discharge it through said outlet openings.

11. An electric heater comprising, in combination, an insulating housing; a plurality of pairs of parallel bus bars removably supported by and within the casing; and thin sheet metal heater elements of low electrical resistance each connected to and supported by a pair of said bus bars; said assembled elements with their respective bus bars being interchangeable and removable independently of each other.

12. An electric heater comprising, in combination, a box-like casing having air inlet and outlet ports adjacent its opposite ends; a plurality of longitudinal partitions of dielectric material secured to opposite side walls of said casing; a plurality of split conductors secured to said casing walls; a plurality of thin sheet metal heating units of low electrical resistance having end flaps clamped in said split conductors and presenting an acute-angled zigzag path to the flow of the current; bus bars secured to said conductor bars; a transformer adapted to supply said bus bars with a large current at low voltage and high amperage; and a fan adapted to force a draft past said transformer and through said heater.

13. An electric heater comprising, in combination, a casing having air inlet and outlet ports; a plurality of longitudinal partitions of a dielectric material dividing said casing into a plurality of separate compartments; a pair of split conductor bars in each compartment; a thin sheet metal heating unit of low electrical resistance and whose increase in resistance with temperature is small, having end flaps clamped in said split conductors; a series of acute-angled corrugations in said heating units extending back and forth in a zigzag path between said partitions; means to supply said conductor bars with a large current at low potential; and means to force a draft of air through said compartments.

14. In an electric heater of the class described, a source of alternating electric current at low voltage and high amperage; a thin sheet metal heating element of low electrical resistance connected at its opposite edges to said source of current so as to create a short circuit, said sheet metal element having a zigzag formation thereby to prevent vibration of the element and to reduce power losses in the heating element through self-induction.

15. An electric heater comprising, in combination, a casing; an air inlet and an outlet; a plurality of resistors of thin sheet metal in the casing, said resistors having a resistivity of between 63 and 82 ohms per mil-foot; and a source of electric current, which passes current of between 2100 and 3800 amperes at voltages of between 1 and 10 volts, through said resistors.

WILLIAM L. EVANS.